United States Patent

Nelson et al.

[11] Patent Number: 5,997,787
[45] Date of Patent: Dec. 7, 1999

[54] METHOD FOR MANUFACTURING INJECTION MOLDED DUTY GEAR CONTAINERS

[75] Inventors: Mark C. Nelson, Chino Hills; Gregory P. Krueger, Upland; Rudolf Stelzer, Phelan, all of Calif.

[73] Assignee: Safariland Ltd., Inc., Ontario, Calif.

[21] Appl. No.: 08/878,541

[22] Filed: Jun. 19, 1997

[51] Int. Cl.[6] .................................................. B29C 45/14
[52] U.S. Cl. ....................... 264/138; 264/274; 264/275; 264/277; 224/911
[58] Field of Search .................................... 264/138, 265, 264/274, 275, 277; 425/121, 193; 224/911

[56] References Cited

U.S. PATENT DOCUMENTS

| | | | |
|---|---|---|---|
| 2,987,229 | 6/1961 | Leclerc | 224/2 |
| 3,902,639 | 9/1975 | Rogers | 224/2 B |
| 4,289,817 | 9/1981 | Valyi | 264/513 |
| 4,340,437 | 7/1982 | Rogers | 156/224 |
| 4,453,996 | 6/1984 | Terizzi, Jr. et al. | 264/275 |
| 4,797,244 | 1/1989 | Sauer | 264/513 |
| 4,905,880 | 3/1990 | Cupp | 224/192 |
| 5,161,721 | 11/1992 | Nichols | 224/243 |
| 5,188,787 | 2/1993 | King et al. | 264/550 |
| 5,351,868 | 10/1994 | Beletsky et al. | 224/245 |
| 5,570,830 | 11/1996 | Nichols | 224/676 |
| 5,672,405 | 9/1997 | Plank, Jr. et al. | 264/274 |

OTHER PUBLICATIONS

Definition of "Wrap" Webster's Ninth New Collegiate Dictionary, p.1361;1990.

*Primary Examiner*—Jan H. Silbaugh
*Assistant Examiner*—Edmund H. Lee
*Attorney, Agent, or Firm*—Christie, Parker & Hale, LLP

[57] ABSTRACT

A method for producing a duty gear container including applying a lining material around a core having a shape of an object to be held in the duty gear container, placing the wrapped core within a cavity of a mold sized to form a void between the wrapped core and an outer mold surface of the mold, and injecting a liquid polymeric molding material into the void to form an outer shell of the duty gear container which bonds with the lining material as the molding material of the outer shell cures or hardens in the mold.

11 Claims, 2 Drawing Sheets

METHOD FOR MANUFACTURING INJECTION MOLDED DUTY GEAR CONTAINERS

FIELD OF THE INVENTION

This invention relates to a method of manufacturing duty gear containers, and more particularly, to a method of injection molding holsters at low pressures.

BACKGROUND OF THE INVENTION

Traditional methods for manufacturing gun holsters and other types of duty gear containers for use by law enforcement personnel are by shaping and sewing multiple leather components. Although in general, leather is adaptable to shaping operations to fit the item retained within the holster or other duty gear container, the shape disappears when the container is subjected to moisture. In addition, there are undesirable limits to which leather can be shaped to conform to the implement being retained within the container.

To address these problems, a thermal forming process was developed to produce a moisture-insensitive container which could be molded to the precise contours of the object to be retained within the container. This process comprises preparing a laminate of at least one layer of liner material and a layer of heat moldable thermoplastic material. The container is produced by heating the laminate to the molding temperature of the thermoplastic material, inserting a forming core inside the laminate and applying pressure from the outside of the laminate wall. The temperature is then reduced to a level below the molding temperature of the laminate.

Although thermal forming plastic sheets of various materials to produce holsters and other duty gear containers has been a significant manufacturing advancement which produces exceptionally high quality holsters and other containers, it is not without its disadvantages. Since the laminate is a sheet which is thermal formed into the desired shape, the adjacent ends of the shaped sheet require a closure mechanism to retain the edges. Typically, the edges are either stitched, riveted, stapled or cemented. A further drawback to this process is that the laminate requires a gluing operation to ensure that the leather or other liner materials stays securely adhered to the thermoplastic layer. A further disadvantage is that once the container is formed, either the outer surface of the thermoplastic layer requires an additional machining process to create an acceptable aesthetic appearance, or more commonly, a second or outer layer of leather needs to be glued to the laminate prior to molding to achieve the acceptable aesthetic appearance. Yet another drawback is that uniform pressure must to be applied to produce the precise contours of the item retained within the container.

All of these drawbacks either require an additional operation during the manufacturing process or they increase the difficulty of a specific step in the process. Consequently, a need exists for an improved method for manufacturing holsters or other duty gear containers which addresses the disadvantages associated with prior thermal forming of laminated containers.

SUMMARY OF THE INVENTION

The present invention provides an improved method for manufacturing holsters and other duty gear containers which improves upon previous methods of manufacturing. The present invention is a process for producing a holster or other duty gear container by injection molding. The method includes the step of wrapping an inner liner material around a forming tool having the outer contours of the weapon or other duty gear to be retained within the holster. The liner material can be either leather, suede or any other natural or synthetic material. The wrapped forming tool is then placed within a mold cavity. The cavity has an outer mold surface which creates the shape and texture of the outside surface layer of the holster or duty gear container. The mold is closed and a liquid polymeric molding material such as a thermoplastic elastomer or other molten thermoplastic material is then injected into the mold. The liquid molding material can be injected under a low or high pressure, sufficient to fill the mold cavity and enclose the wrapped forming tool. A mechanical bond is produced between the molding material and the liner as the liquid or molten material saturates the outer surface of the liner. Upon curing or hardening, the liner material and the injected polymeric molding material become a bonded unit.

The advantages of the present invention include adhesion of the liner material to the injected polymeric molding material during the molding process. The resulting holster is a product that is not made of multiple laminates that can separate, and does not require edges to be stitched, riveted, stapled or cemented together. Other benefits of the present invention include a reduction in the manufacturing steps required to make the product, a reduction in manufacturing time to produce the product, use of various formulations to control various density and hardness characteristics of the product, and a reduction in product manufacturing and energy costs.

These and other aspects of the invention will be more fully understood from the following detailed description around the accompanying drawings.

DETAILED DESCRIPTION

Figure 1:
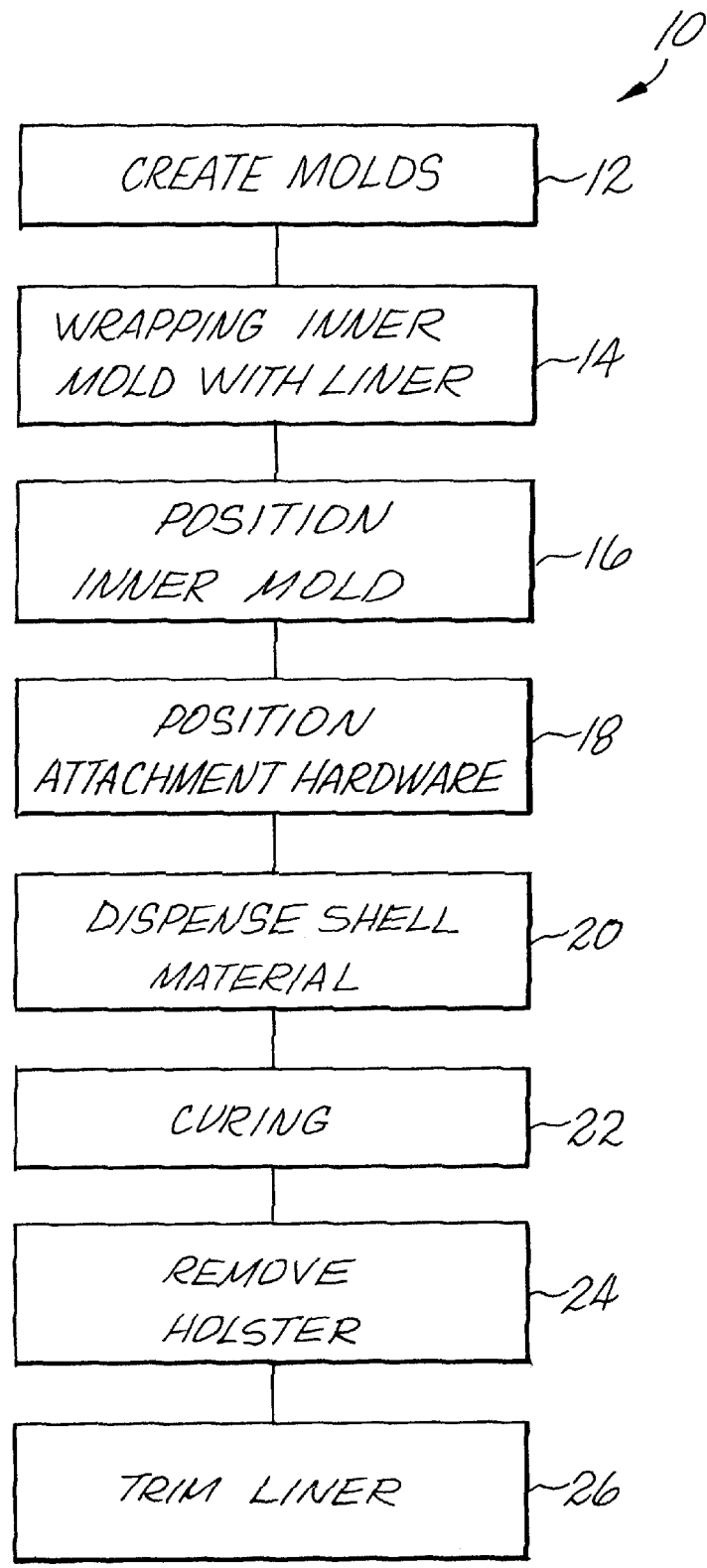
FIG. 1 is a flow diagram illustrating the manufacturing process of the present invention.
Figure 2:
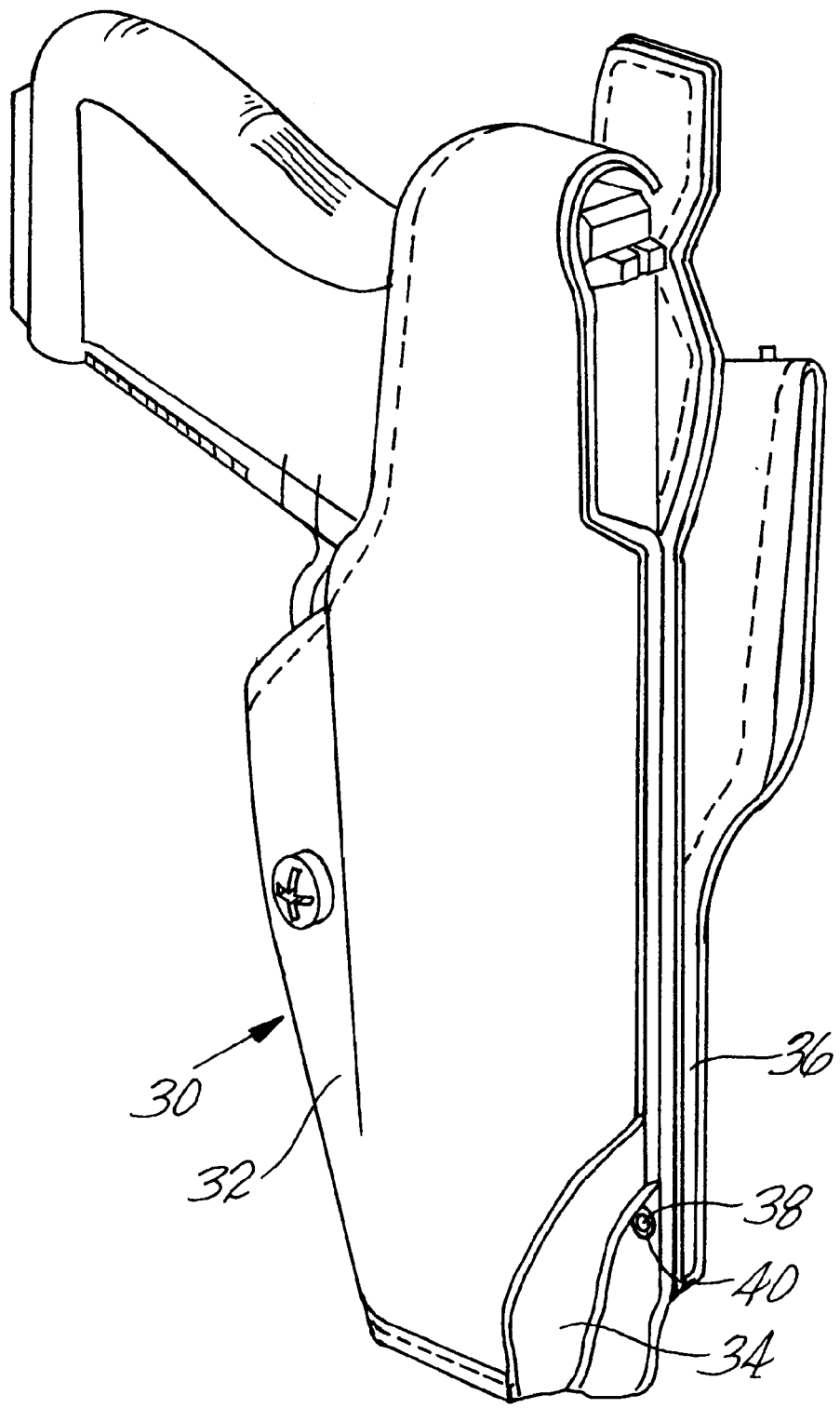
FIG. 2 is a perspective view, partially cut away, illustrating a holster manufactured by the present invention.

Referring to FIGS. 1 and 2, an injection molding method 10 for manufacturing holsters or other duty gear containers begins with creating the specific duty gear container molds 12. Various types of duty gear containers include holsters, handcuff cases, magazine cases, nightstick and flashlight holders, among others. For simplicity, the remainder of the detailed description will be limited to a description for manufacturing holsters, but it is to be understood that the invention is equally applicable to these other types of duty gear containers, for example.

The molds include an inner mold surface and an outer mold surface. The outer mold surface creates the exterior shape and design pattern of the holster. Included in the design of the outer mold surface are mounting points for belt loops or other hardware required for a finished holster. The outer mold surface includes a design pattern for the simulation of leather or any other desired aesthetic pattern or texture. A second or inner mold is used to form the interior shape of the product held in the mold. In the case of a holster, the inner mold surface is formed by a solid core in the shape of a handgun. For various holster designs the core will be in the shape of the particular model of handgun to be retained within the holster. Both the inner and outer mold surfaces are produced using a sample hand gun or a holster as the model.

Typical materials used for producing the inner core and outer mold surface can be a filled epoxy, urethane, silicone resins or a variety of metallic substances such as cast aluminum.

Once the molds have been created, the next step in the manufacturing process is wrapping 14 the inner core with a thin, flexible layer of a liner material. Leather, suede or any other natural or synthetic material can be used as the liner. The liner provides resistance for the handgun contained within the holster as well as moisture absorption, abrasion resistance and cushioning for the handgun. The lining material is porous enough to absorb some molding material yet dense enough to prevent complete saturation. The step of wrapping the inner core with the liner material includes the steps of inspecting the particular liner material for quality so that no holes or thin spots are present in the material. The liner material is then die cut to fit the particular outer surface configuration of the inner core. The edges of the die cut liner material are then skived to create a short angled surface along the edges so that as the liner material is wrapped around the inner mold, the skived edges will overlap to form a single layer thickness of the liner material. The overlapping skived edges are then glued together to retain the liner material around the inner mold surface.

The inner mold formed by the wrapped core is then positioned 16 within the mold and the mold is closed. Next, if necessary for the particular holster design, attachment hardware is positioned 18 within the cavity or void space between the wrapped core and outer mold surface by a pin extending through the mold. The pin suspends the attachment hardware until the void space is filled. A moldable holster shell material is then injected 20 into the mold around the wrapped core. Preferably, the outer holster shell material is injected into the mold to fill the void space between the molds by low pressure injection molding. The dispensing step 20 can also be carried out by high pressure injection molding. The outer shell material is injected in liquid form and a vacuum is drawn on the void space between the core and outer mold surface to remove any air bubbles from the outer shell material. The mold is also vented to eliminate the possibility of void spaces being formed in the holster outer shell.

The preferred outer shell material for the holster is a plural component elastomer including suitable combinations of urethane, epoxy, polyester, or silicone resins. A preferred plural component elastomer includes polyether polyol and a polymeric MDI. Other plural component materials contemplated include polyester polyols and other isocynates. Single component thermoplastics polymeric materials can also be used as the outer shell material, typically in connection with high pressure injection molding. Typical thermoplastic materials include Kydex, nylon, ABS, polyethylene, as well as many other thermoplastics. Typically, a release material of either wax or silicone base is applied to the outer mold surface prior to injecting the outer shell material into the mold.

The molded holster is then allowed to cool to cure or harden 22 the outer shell material. A mechanical bond is produced as the liquid or molten shell material saturates the outer surface of liner material. Upon cure or hardening, the liner material and the injected polymer become a bonded unit. After the molded holster has cured or hardened, the mold is open and the finished product is removed 24. The mold can then be cleaned and the molding process can then be repeated.

After the molded holster is removed from the mold, the excess liner material is then trimmed 26 and the edges of the holster are buffed. The liner material requires trimming because when placed on the inner mold, it is oversized to create a seal to prevent the liquid outer shell material from flowing around the liner during the molding process.

The molds can be preheated to approximately 120–140° F. prior to the injection molding step and a typical circle time for a plural component polyurethane elastomer would be approximately 15 minutes. The outer shell material when cured or hardened preferably produces a Shore hardness in the range of about 80 A to about 100 A.

Referring to FIG. 2, the finished holster 30 comprises a molded plastic outer shell 32 having a natural or synthetic inner liner 34. Once the holster is molded, a belt loop 36 can be attached by screws 38 through the attachment hardware 40 positioned within the outer shell 32.

Although the present invention has been described and is illustrated with respect to a preferred embodiment thereof, it to be understood that it is not to be so limited, since changes and modifications may be made therein which are within the full intended scope of the invention as hereinafter claimed.

What is claimed is:

1. A method for producing a plural component injection molded duty gear container comprising the steps of:

wrapping a layer of a thin flexible self-supporting lining material around an irregular shaped core having a shape of a solid object to be held in the duty gear container;

placing the wrapped core within a cavity of a mold, the cavity sized to form a void space between an outer mold surface of the mold and the wrapped core; and injecting a plural component liquid molding material into the void space of the mold to form an outer shell of the duty gear container which bonds to the lining material as the molding material saturates an outer surface of the lining material and cures or hardens in the mold, the lining material being porous enough to absorb some molding material yet dense enough to prevent complete saturation, the outer shell in its hardened or cured condition having a molded outer surface shaped by the outer mold surface of the mold, the shell forming a unitary outer wall structure of the container having a molded inner surface formed by a surface of the lining material to which the outer wall structure is bonded.

2. The method of claim 1 further comprising a step of positioning attachment hardware in the void space between the wrapped core and the mold prior to injecting the molding material.

3. The method of claim 1 further comprising the step of trimming excess lining material from the outer shell.

4. The method of claim 1 wherein the duty gear container is a holster.

5. The method of claim 1 wherein the lining material is leather.

6. The method of claim 1 wherein the lining material is a synthetic resinous material.

7. The method of claim 1 wherein the liquid molding material is a synthetic elastomeric material.

8. The method of claim 1 wherein the step of injecting liquid molding material is by low pressure injection molding.

9. The method of claim 1 wherein the injecting step is by high pressure injection molding.

10. The method of claim 1 wherein the liquid molding material is a thermoplastic material.

11. The method of claim 1 wherein the molding material is a heat curable synthetic resinous material.

* * * * *